United States Patent [19]
Poubeau

[11] 3,955,858
[45] May 11, 1976

[54] SATELLITE MOMENTUM WHEEL

[75] Inventor: Pierre Poubeau, Le Pecq, France

[73] Assignee: Societe Nationale Industrielle Aerospatiale, Paris, France

[22] Filed: Dec. 31, 1974

[21] Appl. No.: 537,835

[30] Foreign Application Priority Data
Jan. 3, 1974 France .............................. 74.00190
Dec. 10, 1974 France .............................. 74.40556

[52] U.S. Cl. .................................. 308/10; 244/166
[51] Int. Cl.² ........................................ F16C 39/00
[58] Field of Search ................. 308/10; 244/1, 165, 244/166; 74/5.5, 5.46, 5.7

[56] References Cited
UNITED STATES PATENTS

| | | | |
|---|---|---|---|
| 3,243,238 | 3/1966 | Lyman | 308/10 |
| 3,490,816 | 1/1970 | Lyman | 308/10 |
| 3,698,775 | 10/1972 | Gilbert | 308/10 |
| 3,787,100 | 1/1974 | Habermann | 308/10 |
| 3,791,704 | 2/1974 | Perper | 308/10 |

Primary Examiner—R. Skudy
Attorney, Agent, or Firm—Karl W. Flocks

[57] ABSTRACT

The invention provides a satellite momentum wheel with passive magnetic centering means, between a stator and a rotor comprising at least one passive radial magnetic centering device, at least one axial magnetic centering device slaved to an axial velocity sensor and to an axial position sensor, at least one centering motor-generator unit having a magnetized rotor and a stator with toroidal windings switched by an angular rotation position sensor, at least one damping device, two emergency taper pivots for safe centering of the axial mounting of the rotor one of which is possibly in contact with a doped-polyamide step bearing on the stator, and interconnecting means between the wheel rim and the axis of said pivots employing a so-called coated arrayed-thread type cycloprofile structure.

14 Claims, 22 Drawing Figures

SATELLITE MOMENTUM WHEEL

The present invention relates to a momentum wheel for satellites and more particularly to a magnetically suspended momentum wheel for satellites, comprising a rotor and a stator.

As is known, satellite inertial systems may be required to operate as a reaction wheel between maximum and zero rotation speeds in either direction, as a momentum wheel rotating at around a modulated nominal speed, or as an energy recovery wheel between a maximum permissible speed and the minimum speed for providing sufficient electromotive force in the armature circuit of a motor-generator.

In each case the fundamental problems to be overcome in designing a satellite wheel of this kind invariably concern the bearings, the mechanical strength of the wheel and the ability of the system to withstand the launch phase.

Thus it is necessary to think in terms of long satellite operating periods of close on ten years, without any possibility of intervention in a severe environment of high vacuum and intense cosmic radiation subsequent to a launch involving a considerable level of vibration under acceleration.

In the matter of the bearings, although the prior art includes active magnetic centering devices, the latter are little consistent with the operating conditions just mentioned.

Similarly, wheel rotor designs providing for a linking housing between the wheel rim and the rotation shaft have been proposed, but this solution does not entirely overcome the problem of the centrifugal tensile stresses set up in the housing-shaft connection, for it is well-known that a wheel-rim peripheral velocity in the region of 500 m/sec will already produce loads capable of causing an elongation of nearly 1% in the wheel rim in the case of steel, thereby considerably stressing the assembly even though the latter is customarily fabricated homogeneously, by electron beam welding for example.

Finally, the question of reliability suggests the provision of passive magnetic centering devices in lieu of active magnetic centering devices requiring a highly elaborate servo control sequence and providing a back-up safety centering device at the two bearing points of the rotor shaft. The reliability aspect also enters into the overall structural design both in regard to the optimum clearances compatible with the electromechanical components of the motor-generator unit and in regard to damping of the oscillations which occur at the transitions through the critical speeds by reason of the limited radial rigidity of the passive magnetic centering means used accordingly.

Nonetheless, in accordance with Earnshaw's theorem, which implies servo control for at least one axis, such servo control must be provided in any design involving the use of passive radial magnetic centering devices.

This invention accordingly provides a satellite momentum wheel with passive magnetic centering means, between a stator and a rotor comprising at least one passive radial magnetic centering device, at least one axial magnetic centering device slaved to an axial velocity sensor and to an axial position sensor, at least one centering motor-generator unit having a magnetized rotor and a stator with toroidal windings switched by an angular rotation position sensor, at least one damping device, two emergency taper pivots for safe centering of the axial mounting of the rotor one of which is possibly in contact with a doped-polyamide step bearing on the stator, and interconnecting means between the wheel rim and the axis of said pivots employing a so-called coated arrayed-thread type cyclo-profile structure.

The invention further provides on the momentum wheel a wire-wound inertial rim, a carbon-thread hollow shaft coaxial with the spin axis, and two enveloping housings.

In a first embodiment of the invention, there is provided at either end of the rotor a passive radial magnetic centering device, an active axial magnetic centering device slaved to an axial velocity sensor and to an axial position sensor, a damping device and a motor-generator.

In a simplified alternative embodiment, axial monitoring is provided by a single axial magnetic centering device of the electromagnetic type, instead of two, and furthermore rotation of the wheel or generation of electricity is effected by means of a single motor-generator instead of two, the remaining component parts, to wit the velocity and axial position sensors, the dampers and the radial centering devices, consecutively occupying adapted locations within the wheel proper.

Further particularities and advantages of the present invention will emerge from the description which follows with reference to the accompanying non-limitative exemplary drawings, in which.

Figure 9:
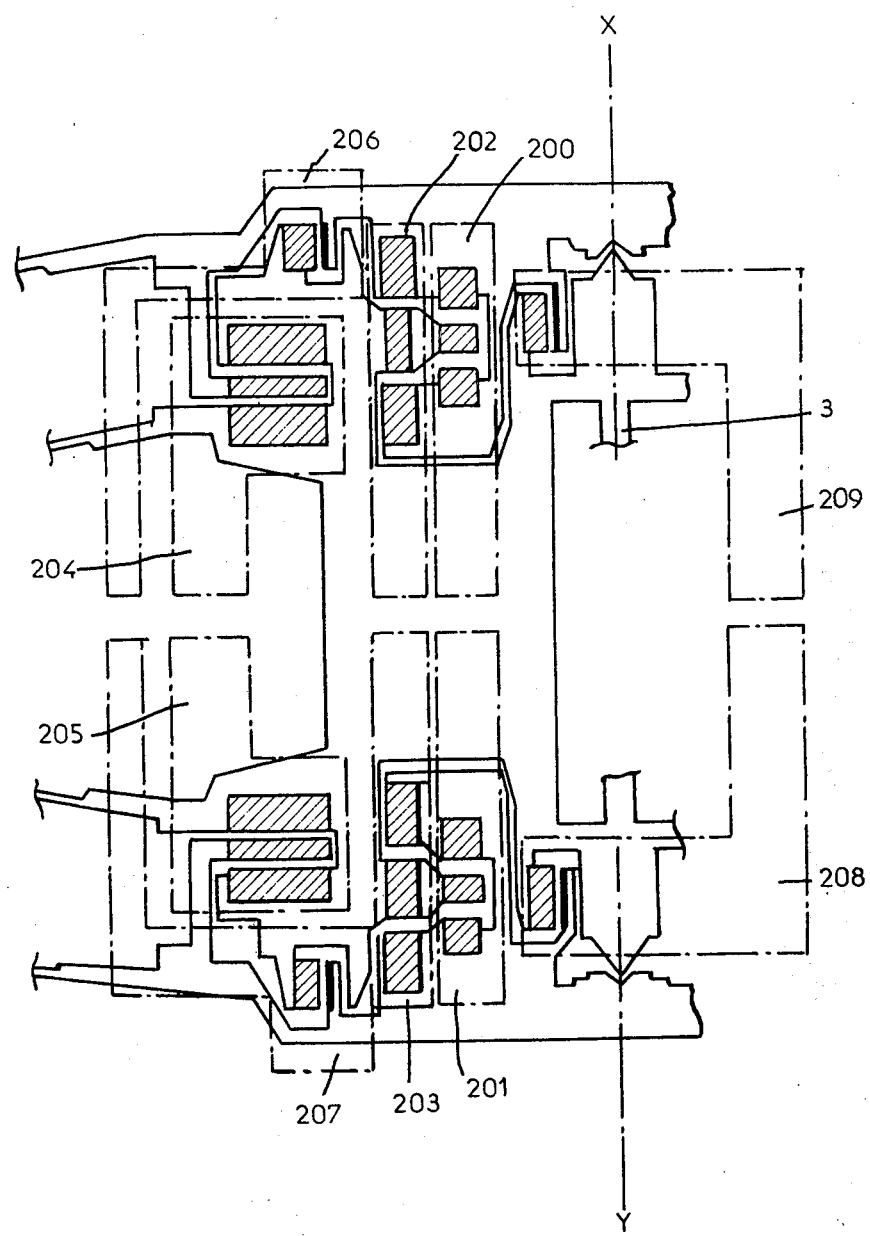
FIG. 9 is an explanatory diagram showing the locations of the component parts of the wheel portrayed in FIG. 1.
Figure 11:
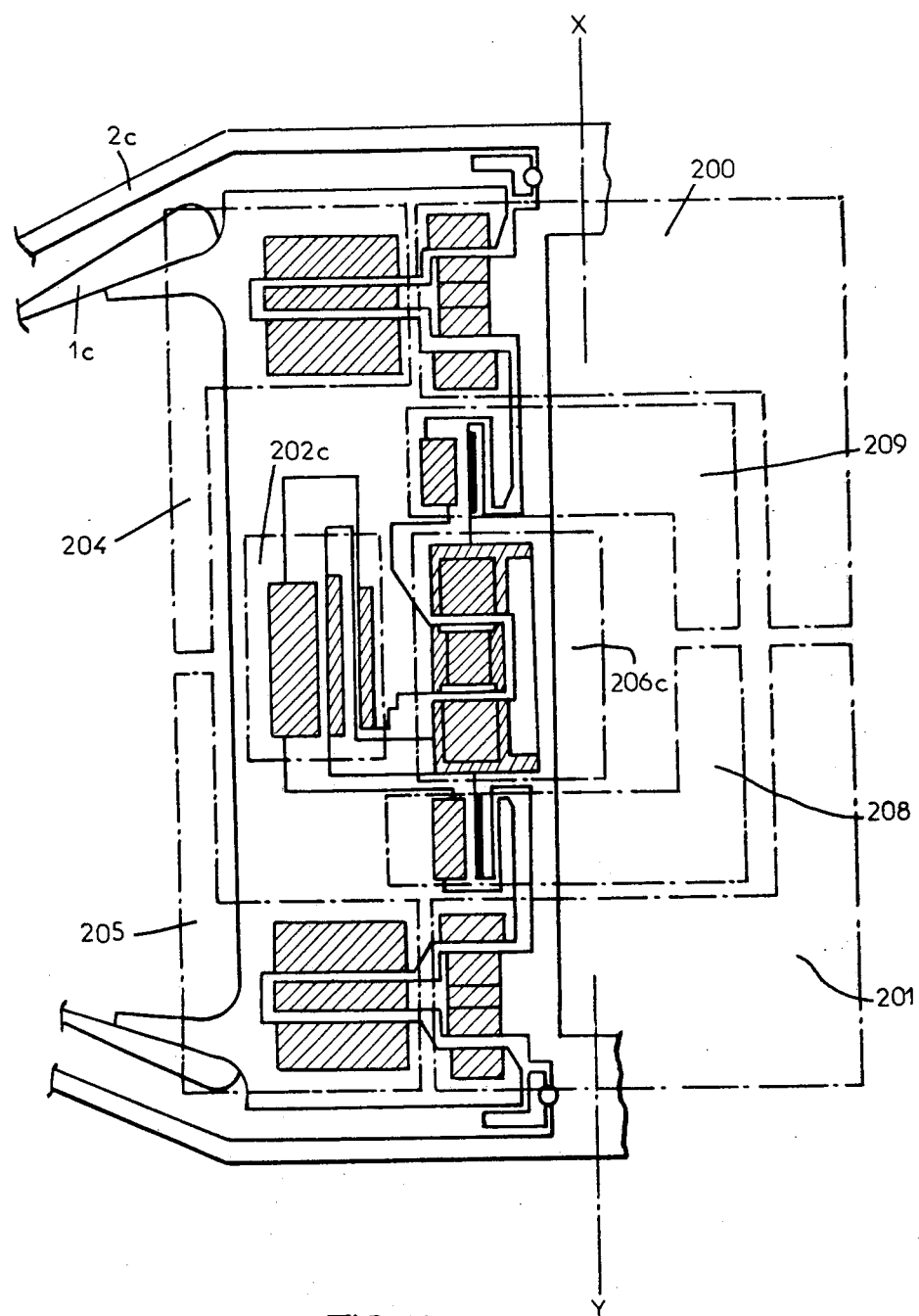
Figure 12:
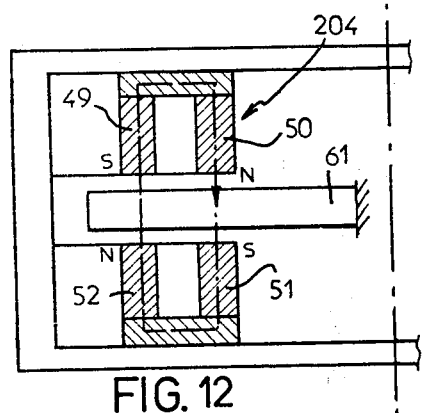
Figure 13:
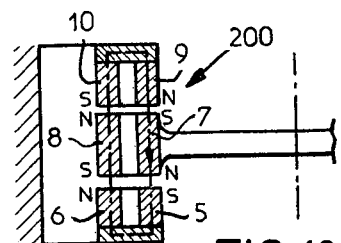
Figure 14:
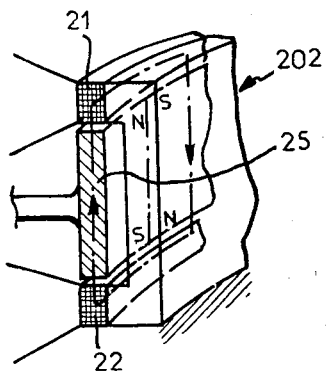
Figure 15:
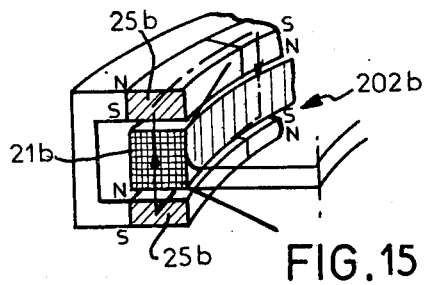
Figure 16:
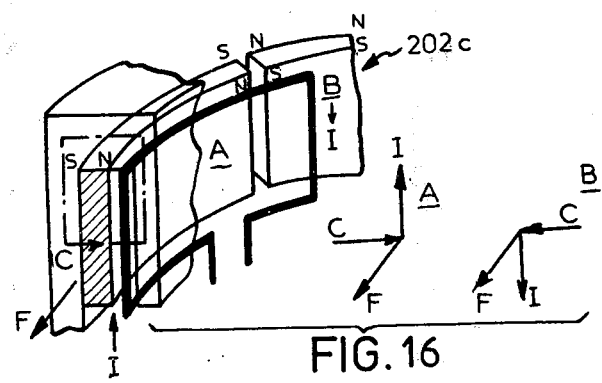
Figure 17:
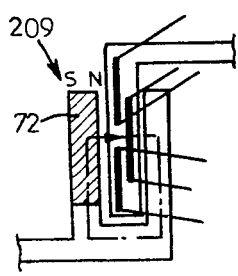
Figure 18:
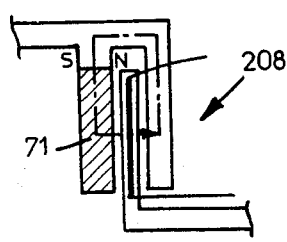
Figure 19:
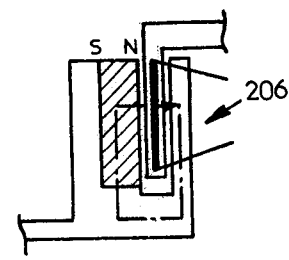

FIGS. 12 through 19 are explanatory detail diagrams for simply illustrating the manner of operation of certain of the component parts of a momentum wheel according to this invention, to wit: a damper in FIG. 12, a radial centering device in FIG. 13, a centering motor-generator in FIG. 14, motor-generators in FIGS. 15 and 16, an axial position sensor in FIG. 17, an axial velocity sensor in FIG. 18, and an axial actuator in FIG. 19. These illustrations clearly show how such devices can be applied both in a layout as shown in FIG. 9 and in a simplified layout as shown in FIGS. 10 and 11.

Figure 10:
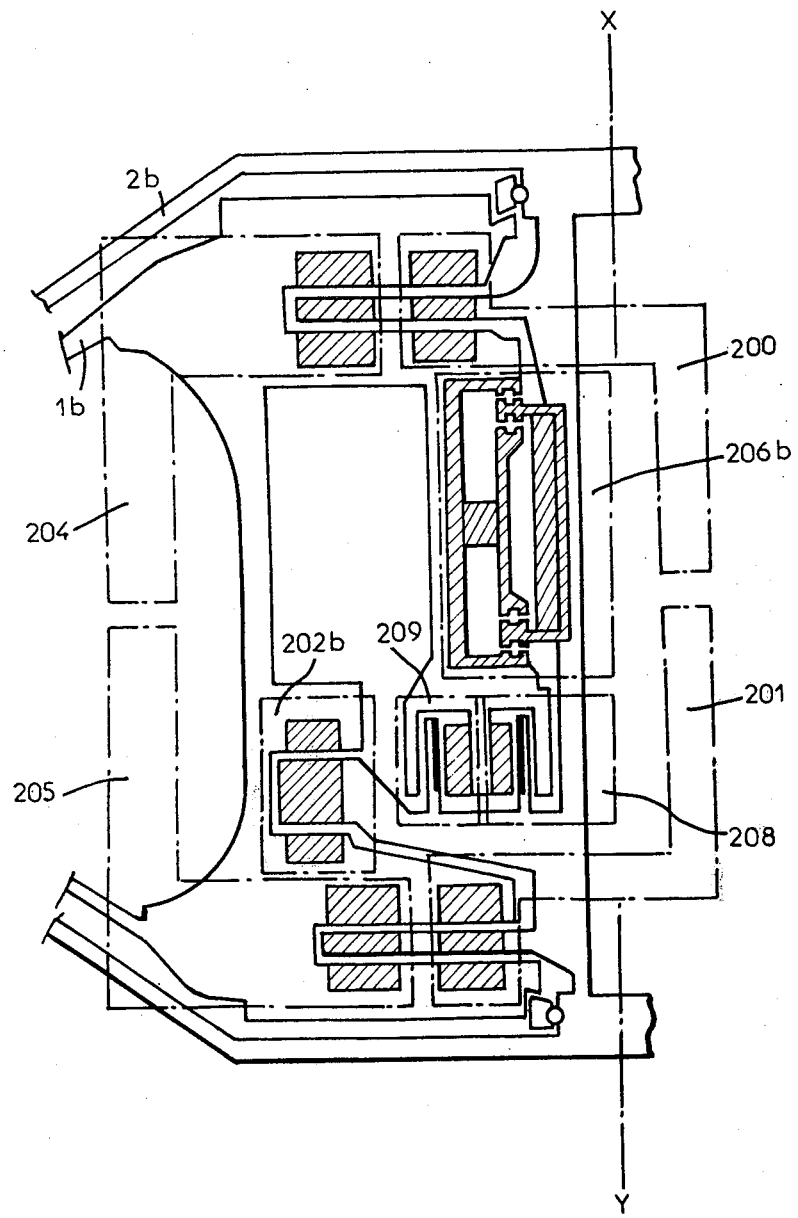
FIGS. 10 and 11 are illustrations similar to that in FIG. 1, showing two possible simplified layout arrangements.
Figure 20:
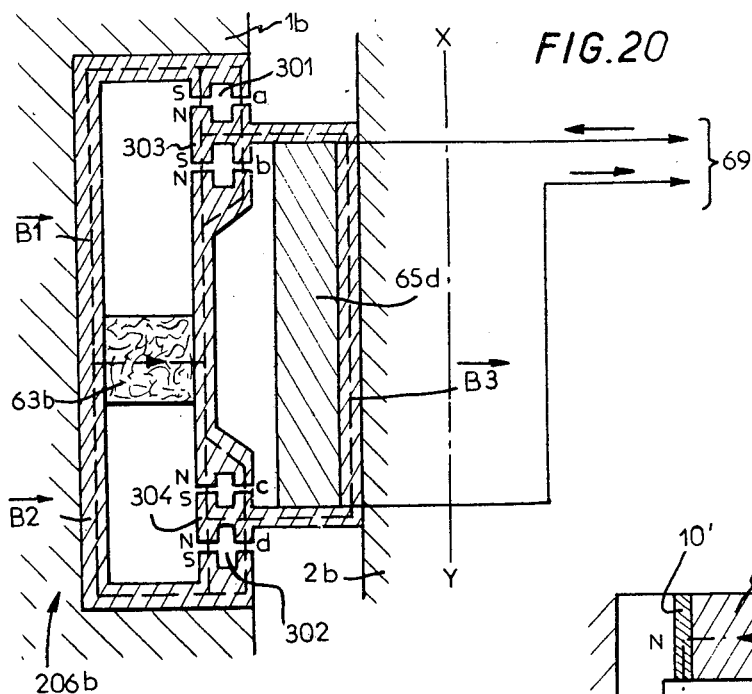
Figure 22:
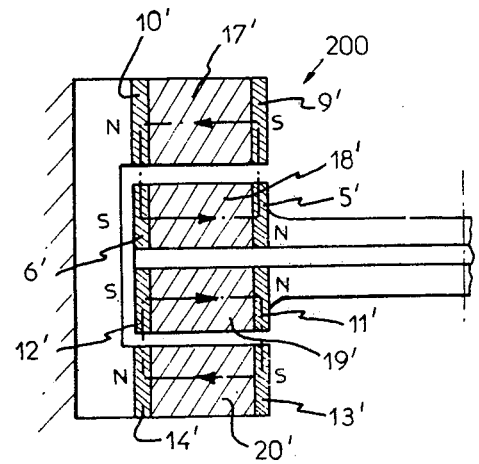
Figure 21:
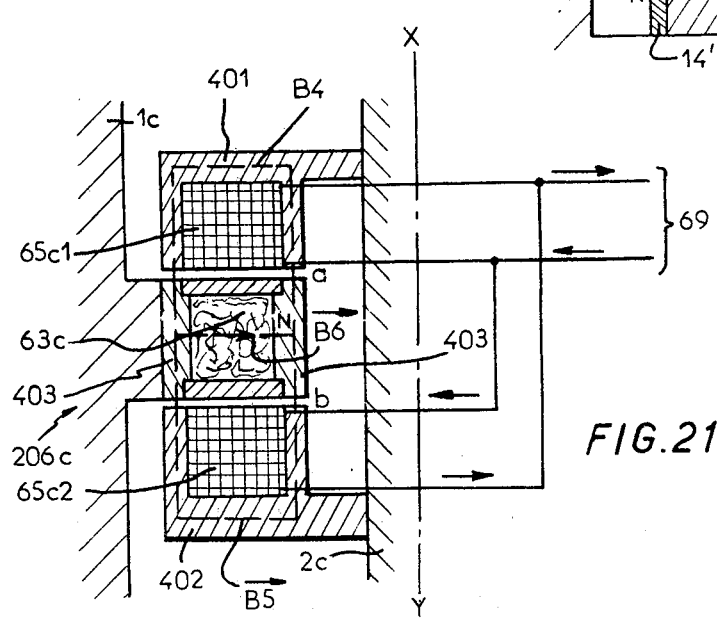

FIG. 20 is an axial diagrammatic illustration, on an enlarged scale, of the single axial actuator as applied to the form of embodiment shown diagrammatically in FIG. 10;

FIG. 21 is an axial diagrammatic view illustrating, on an enlarged scale, the single axial actuator as applied to the form of embodiment depicted in FIG. 11; and FIG. 22 is a detail illustration of a radial-magnetization centering device for use alternatively to the one shown in FIG. 13.

Figure 1:
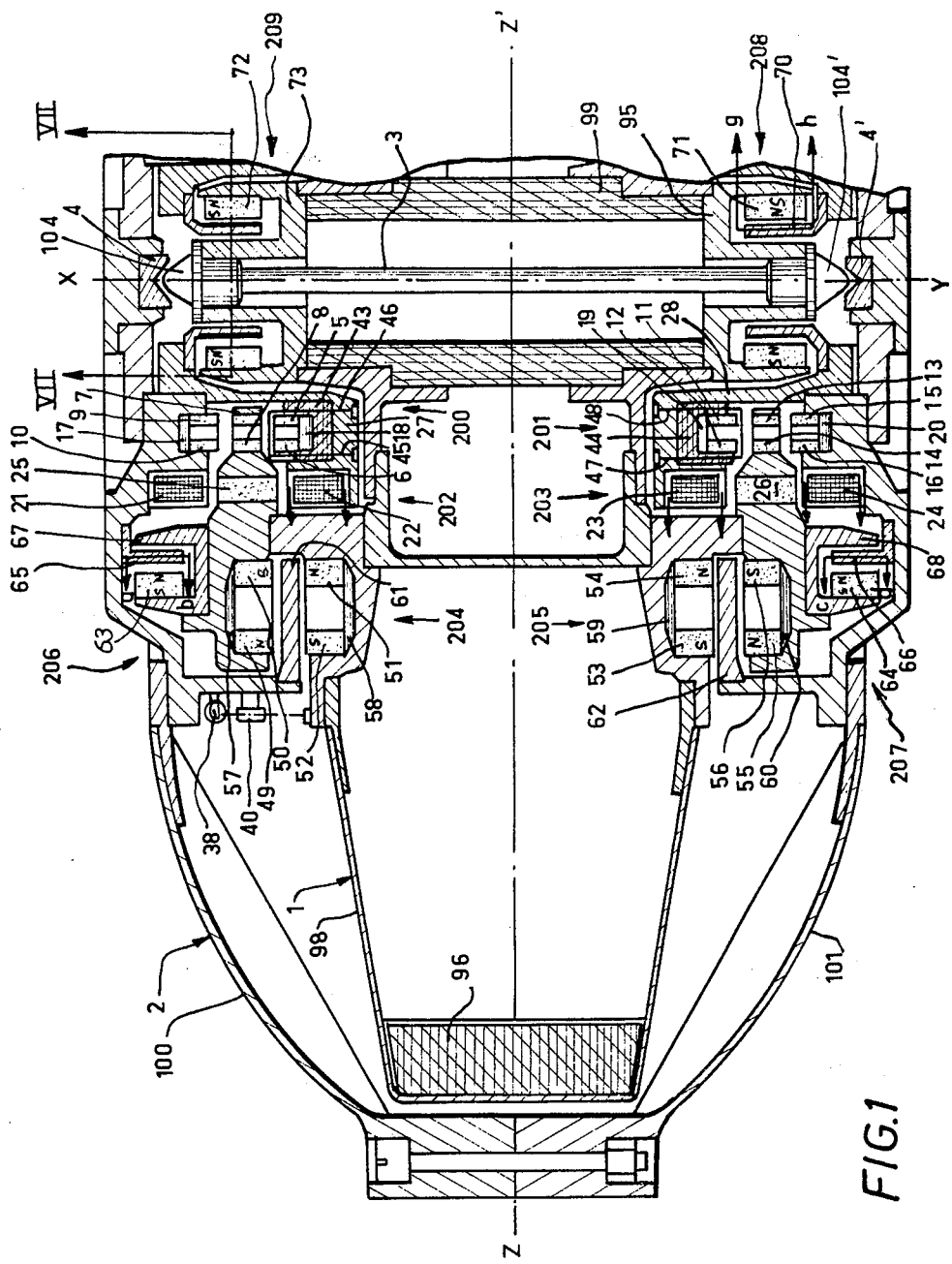
FIG. 1 is a partial view in axial section of a satellite momentum wheel according to the invention.

Reference is first had to FIG. 1 for a partial diagrammatic sectional view along the spin axis XY and a diameter ZZ' of a satellite momentum wheel according to this invention, comprising a stator section 2 enveloping a rotor section 1 mounted about a shaft 3. Rotor 1 is normally maintained in a proper position within stator 2 by axial and radial centering devices or magnetic bearings comprising magnetic cores of revolution about the axis XY and windings to be described in detail hereinafter.

Shaft 3 is a redundant shaft, that is to say that it is not normally active, it being possible for its pivots 104 and 104' to be made to contact the associated step bearings 4 and 4' of stator 2 only in special circumstances such as during launch or due to the failure of the axial centering devices.

Positioning of rotor 1 in relation to stator 2 during normal operation involves axial centering in the direction XY and radial centering in the diametrical direction ZZ' for example (FIG. 1).

Radial centering is provided by a system of magnetic centering devices consisting of several units, including magnetic core type centering devices 200 and 201 at either end and centering motor-generators 202 and 203 likewise at either end.

Each centering device 200 (or 201) comprises rectangular-section cores of high aspect ratio made of a high-magnetic-energy material such as samarian-cobalt, for instance.

These cores, designated by reference numerals 5 through 10 and 11 through 16 in FIG. 1, have opposite and complementary polarities, and the flux closes through air gaps and armatures 17–18, 19–20 on stator 2.

Each centering motor 202 or 203 is formed on stator 2 by two high-aspect-ratio rectangular section cores designated 21–22 and 23–24 and supporting armature windings and a torodial field-magnet element on rotor 1, designated 25 and 26, made of a high magnetic energy material such as samarium-cobalt and with its magnetic flux alternating over 180° and directed circularly and closing back upon itself by reason of the alternating polarities.

Figure 2:
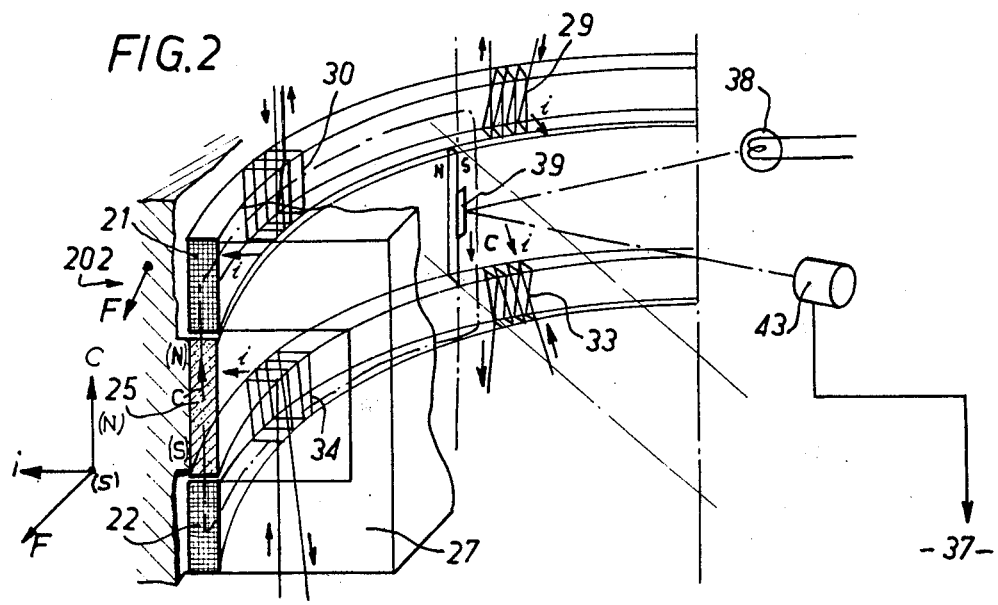
FIG. 2 is a partial perspective showing of the motor-generator used in the momentum wheel of FIG. 1.
Figure 3:
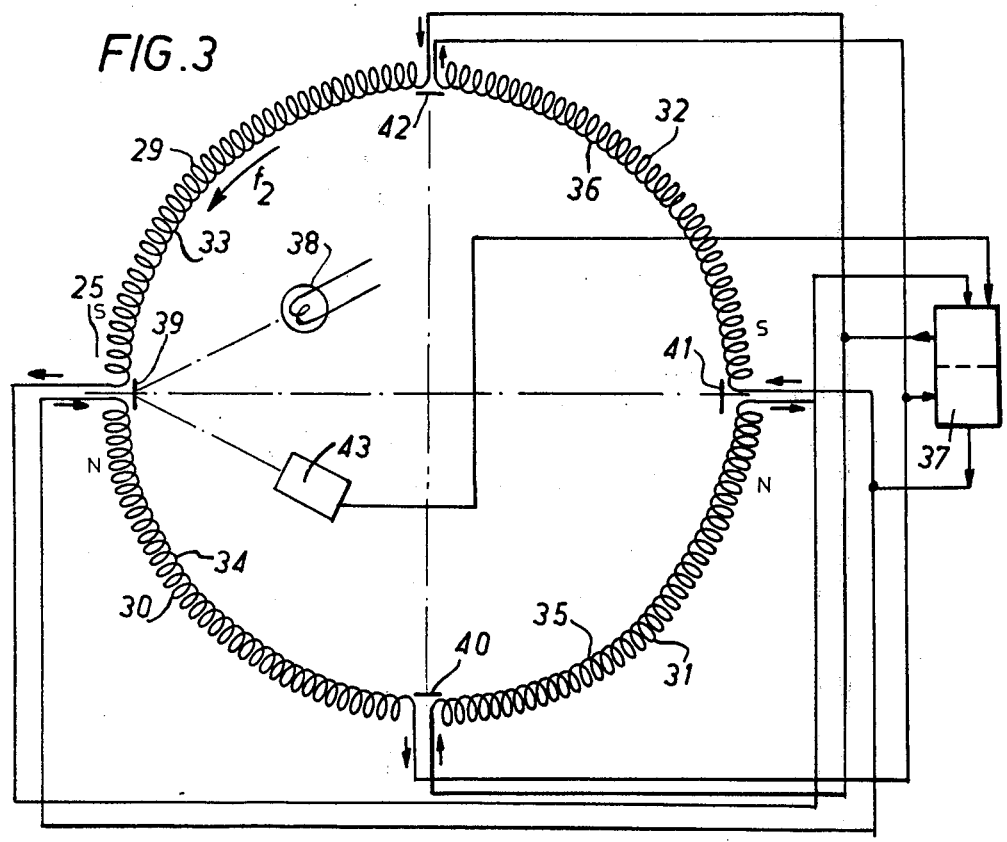
FIG. 3 is a diagrammatic plan view of the motor-generator of FIG. 2.

The theory of operation of each of motor-generators 202 and 203 is clearly revealed in FIGS. 2 and 3, which show respectively in partial perspective and in plan view the parts corresponding to reference numerals 21, 22, 25 and 27 in FIG. 1, it being clearly understood that the parts designated 23, 24, 26 and 28 at the other axial end of the rotor are symmetrical counterparts thereof.

FIG. 2 shows that each of cores 21 and 22 receives four toroidal windings 29 through 32 and 33 through 36, respectively, energized from a control box 37 driven by a system of the magnetic or photoelectric type comprising a light generator 38, four reflecting mirrors 39 to 42 attached to the rotor and a photodiode 43.

A motor-generator as hereinbefore described functions in the following manner:

At the particular instant in time corresponding to the portrayal in FIGS. 2 and 3, a current $i$ is applied by box 37 to the windings 29–33, 31–35 in the direction represented by the small arrows alongside the conductors.

At that specfic instant, those conductor portions lying in the air gaps will thus be subjected to the magnetic field $c$ and will all be crossed by the current $i$, the direction of which, in accordance with the laws of induction, will determine an electromotive force F which will rotate the motor until appropriate switching is effective in changing the direction of this current and energizing coils 32–36 and 30–34, that is to say during a quarter of a turn in the direction of arrow $f_2$ in this particular example.

Referring next to FIG. 3, it may be seen that such rotation will continue until the N-S junctions of toroidal magnet 25 are in a vertical position in the drawing, following which mirror 42 will occupy the position of mirror 39 whereby to switch out the current to coils 29–33 and 31–35 and appropriately energize coils 32–36 and 30–34.

Rotation continues in this way at a speed that may be determined by a switching clock slaved to sensor 43 when the system is operating in the motor mode. When the same operates as a generator, the same sensor 43 may be made effective in controlling the current generated by the armature windings selected in such manner as to accordingly obtain a unidirectional current.

The function of the high radial rigidity passive magnetic centering device just described is performed by virtue of the high-aspect-ratio rectangular section of the magnetic cores of the centering devices and the motor-generators.

Thus the high-aspect-ratio section of magnetic cores 5 through 10 and 25, or 11 through 16 and 26, is sufficient to ensure adequate radial rigidity of the rotor. However, a plurality of magnetic cores could be added to those illustrated, if need be.

Rotation of the rotor centered by magnetic bearings implies, for transition through the critical speeds, provision for damping the oscillations engendered by possible excitation phenomena and the limited radial rigidity of the magnetic bearings.

An initial damping may be introduced at the level of the magnetic cores of the centering devices.

Cores 5, 6 and 11, 12 are accordingly encased in a charged elastomer 43–44 and supported axially by fine steel wires 45 through 48 having a diameter of 0.2mm, say.

A second damping system 204 and 205 complementary to the first damping system is formed on the rotor by rectangular-section magnetic cores 49 through 52 and 53 through 56, respectively, made of a high magnetic energy material such as samarium-cobalt, and the magnetic flux accordingly closes through armatures 57–58 and 59–60.

Positioned on the stator, in the air gap of said magnetic cores, are two conducting discs 61, 62 made of aluminium, silver or copper for example, and any radial shift of the rotor generates, in accordance with Lenz' law, currents to be induced in the metal that ineract with the magnetic field to produce forces opposing the disrupting motion.

As already indicated, full magnetic suspension of the rotor implies, in accordance with Earnshaw's theorem, active servo control in the axial direction.

The magnetic centering system for axial servo control is provided by two loudspeaker-type electrodynamic actuators 206 and 207 controlled by electronic network which processes an axial position signal and an axial velocity signal.

Each of actuators 206 and 207 essentially includes to that end, on the rotor, a toroidal magnet 63 (or 64) having a radial magnetic field directed towards the spin axis. A torodial winding 65 (or 66) on the stator lies within the magnetic field, the latter being closed back onto the rotor through armatures 67 and 68 respectively.

Windings 65 and 66 are energized via connections (a, b–c, d) from a control box 69 (FIG. 4) receiving signals from the axial position sensor 209 which thus delivers amplified control signals to the actuators directly.

Axial velocity sensor 208, which functions in similar fashion to the actuators but as a signal generator, consists of a single toroidal winding 70 carried on the stator, in the field of a toroidal magnet 71 attached to the rotor, which field closes through armature 95. Whereas the axial velocity sensor can process the signals from a winding directly, this is not so in the case of the axial position sensor 209 that concurrently slaves the actuators.

FIGS. 4 through 7 depict the theory of operation of such an axial position sensor consisting essentially, on the rotor, of a high magnetic energy toroidal magnet 72 of the samarium-cobalt kind for example, magnetized radially and alternately along six sectors, an armature 73 for closing the magnetic flux and, on the stator, a first set of twice six axial-loop windings designated 74 through 79 and 80 through 85, a second set of six windings coaxial with the first and designated 86 through 91, and three monitoring boxes 92, 93, 94, the central one of which sends the correction signals to control box 69 through connections e and f.

Figure 5:
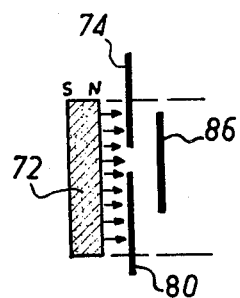
FIGS. 5 and 6 are complementary views in partial section of the position sensor of FIG. 4.
Figure 6:
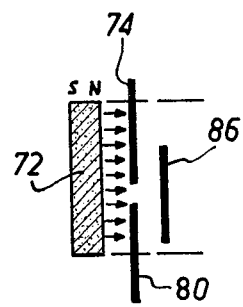

Depending on the instantaneous axial position of the magnetic circuit as determined by the field of magnet 72, a lesser or greater portion of the circuits of loops 74 to 80 and 85 is subjected to the magnetic field, as shown in FIGS. 5 and 6.

As the rotor rotates in the direction of arrow $f_1$ for example, the electromotive force induced in loops 74 to 79 increases whereas that induced in loops 80 to 85 decreases, and this by virtue of the laws of induction.

By arranging the loops 74 to 79 amd 80 to 85 in mutual opposition, there is produced at the terminals of these windings in monitoring boxes 92 to 94, a signal $e_o$ proportional to the deviation in axial position with respect to a given datum. This signal $e_o$ is likewise proportional to the rotation speed by reason of the fact that a third set of loops 86 to 91 furnishes an induced reference electromotive force $e_1$ which is independent of the axial position and proportional to the rotation speed since all these loops lie by design within the magnetic flux, as shown in FIGS. 5 and 6.

Except for noise effects, therefore, the ratio $e_o/e_1$ is proportional to the axial deviation and independent of the rotation speed, and the signal corresponding thereto is applied from control box 93 to control box 69 via connections e–f for transmission to actuators 206 and 207 via connections a, b–c, It is to be noted that the number of loops, which is six in the present example, may be any number whatsoever provided that it is even.

In normal operation, that is to say during satellization, the axial monitoring process hereinbefore described ensures total suspension of the rotor, it being acceptable for the latter to exhibit play of the order of 1 to 2mm with respect to the stator in both the radial and axial directions. In the event of failure of the active axial monitoring system, however, one of the step bearings 4 or 4', which are self-lubricating and made of a material of the doped polyamide type, receives one or the other tapering end 104 or 104' of shaft 3 which is made of a special material of the tungsten carbide kind, thereby to correctly maintain the rotor. The characteristics of the step bearings and of shaft 3 will ensure satisfactory operation for several thousand hours—which the prior art was unable to provide.

Referring again to FIG. 1, it may be seen that the rotor includes a rim 96 which in accordance with the invention is preferably made of a wire-wound material utilizing high tensile steel wire, impregnated carbon filament or glass filament, or boron carbide filament or silicon in an aluminium matrix.

Figure 8:
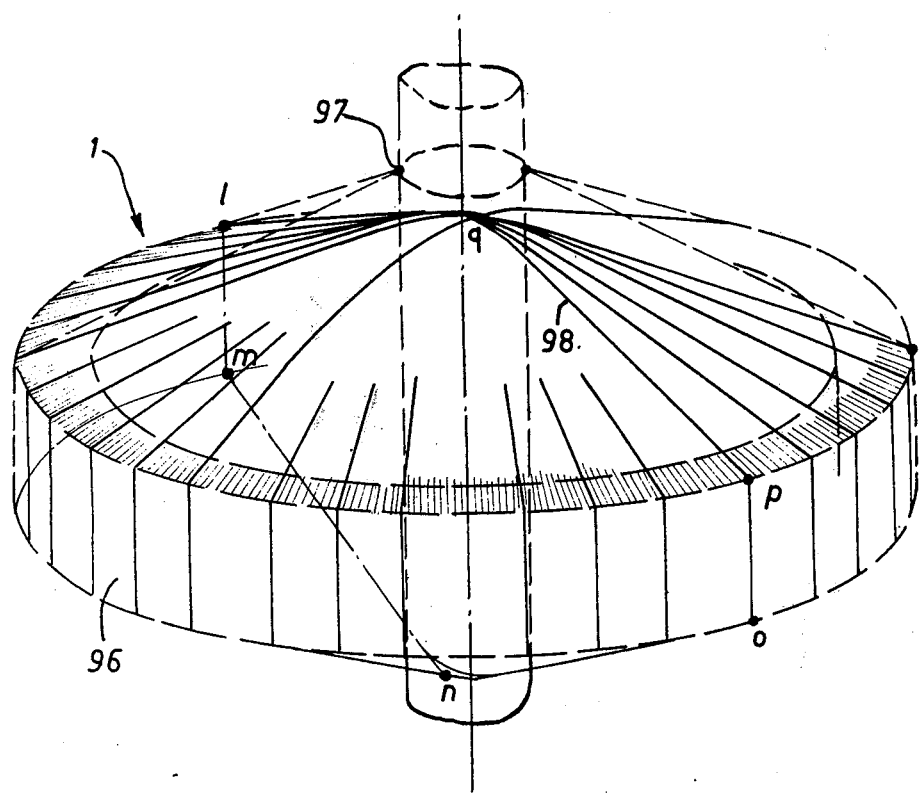
FIG. 8 is a perspective view of the "cycloprofile" structure of the rotor.

The rim 96 is joined to the central portion by a layer of threads arranged in a so-called cycloprofile structure as schematically illustrated in FIG. 8.

The main advantage of this winding technique is that it does not subject the connection points between the rim-bearing housing and the rotation shaft to dangerous loads. Thus FIG. 8 shows that in the prior art the assembly point 97 formed a difficult-to-eliminate weak point.

The object of the cycloprofile technique used in this invention is to produce windings of impregnated layers of threads or filaments in which none of the threads is interrupted, thereby imparting exceptional fatigue strength to the structure. Thus it will be seen that if one considers one of the layered threads at random, designated by reference numeral 98 in FIG. 8, it will be seen that it follows the path $l, m, n, o, p, q$ and runs tangentially aganist the shaft in unbroken fashion.

The hollow shaft 99, by means of which the rotor components are assembled and centered, is made of carbon fibres with a density of 1.55, as are also the two ribbed half-housings 100 and 101 which are wire-wound using the same cycloprofile technique.

It has been found in practice that the first embodiment of the invention provides a satellite momentum wheel with an approximate weight of 10kg for a rotation speed of 30,000 rpm. The rotor-stator assembly can be used either as a reaction wheel or momentum wheel in conjunction with a motor, or as an energy recovery wheel in conjunction with a generator during certain flight phases such as passages through shadow or during momentary failure of the generators, for instance.

Obviously, during operation in the generator modes, the electric circuits are adapted accordingly.

It should be noted that it is possible to associate two contrarotating momentum wheels in order to be able to accelerate the wheels for energy accumulation and decelerate them for energy recovery without creating perturbing moments on the satellite.

Reference to FIG. 9 shows that, with the layout according to the embodiment illustrated in FIG. 1, the necessary component parts referred to precedingly are grouped together mainly at the two ends of the rotor shaft 3.

In order to clarify this layout and avoid ambiguities of interpretation, the location of each of said component parts is defined by its outline in dot-dash lines. Further, each of these components is designated in FIG. 9 by the same reference numerals as those in FIG. 1.

More specifically, the layout is such that the following components are grouped together at one end of the rotor, for instance at its upper end:
an upper radial centering device designated 200;
an upper centering motor-generator designated 202;
an axial position sensor designated 209;
an upper damper designated 204; and
an upper axial actuator designated 206.

The following components are grouped together at the other end of the rotor:
a lower radial centering device designated 201;
a lower centering motor-generator designated 203;
an axial velocity sensor designated 208;
a lower damper designated 205; and
a lower axial actuator designated 207.

It will be immediately apparent that whereas the location of radial centering devices 200 and 201 and of dampers 204 and 205 near the ends of the rotor is justified by considerations of efficient centering, this is not so in the case of certain other components bearing in mind the principle of simplification mentioned in the preamble. The positions of the axial actuator (when there is only one), of the position and axial velocity sensors and of the motor-generator (when there is likewise only one) could, in particular, be revised. These component parts could be placed in different locations, notably in the remaining space available between the axial ends of the rotor.

Thus, more generally, either of the two simplified layouts illustrated schematically for exemplary purposes in FIGS. 10 and 11 may be adopted.

In the embodiment in FIG. 10, there is disposed between the pair of upper and lower dampers 204 and 205 and the pair of upper and lower radial centering devices 200 and 201, a single axial actuator designated be reference numeral 206b (to which reference will be made in greater detail hereinafter), with its axial position sensor 209 and axial velocity sensor 208, on one hand, and a single motor-generator designated by reference numeral 202b (to which reference in greater detail will likewise be made hereinafter), on the other.

In the form of embodiment in FIG. 11, there is disposed between the pair of upper and lower dampers 204 and 205 and the pair of upper and lower radial centering devices 200 and 201, a single axial actuator designated by reference numeral 206c (to which reference in greater detail will be made hereinafter) with its axial position sensor 209 and axial velocity sensor 208, on one hand, and a motor-generator designated by reference numeral 202c (to which reference in greater detail will likewise be made hereinafter), on the other.

It should be noted that in both forms of embodiment in FIGS. 10 and 11, use may be made with advantage, for certain of the component parts, of those employed in the embodiment described with reference to FIGS. 1 through 8, and this without need for special modification.

This applies in the case of the following component parts:

The upper and lower dampers 204 and 205 respectively, the manner of operation of which is depicted in FIG. 12; a fixed conducting disc 61 is placed in a magnetic field produced by two pairs of magnets fast with the rotor and coupled in pairs, to wit 49–50 and 51–52 respectively. According to Lenz' law, the current induced in the conducting metal interacts with the magnetic field to produce forces opposing the disrupting motion.

The axially magnetized upper and lower radial centering devices 200 and 201 respectively, the manner of operation of which is depicted in FIG. 13 and in which the high-axial-aspect-ratio rectangular magnetic cores 5–6, 7–8 and 9–10 provide great radial stiffness if the materials employed possess high magnetic energy, such as samarium-cobalt.

FIG. 22 shows an alternative embodiment in which use is made of the radial magnetization of magnetic cores 17'–18'–19'–20', the fields then closing through soft iron toroidal rings 10'–6'–12'–14' and 9'–5'–11'–13'.

Figure 4:
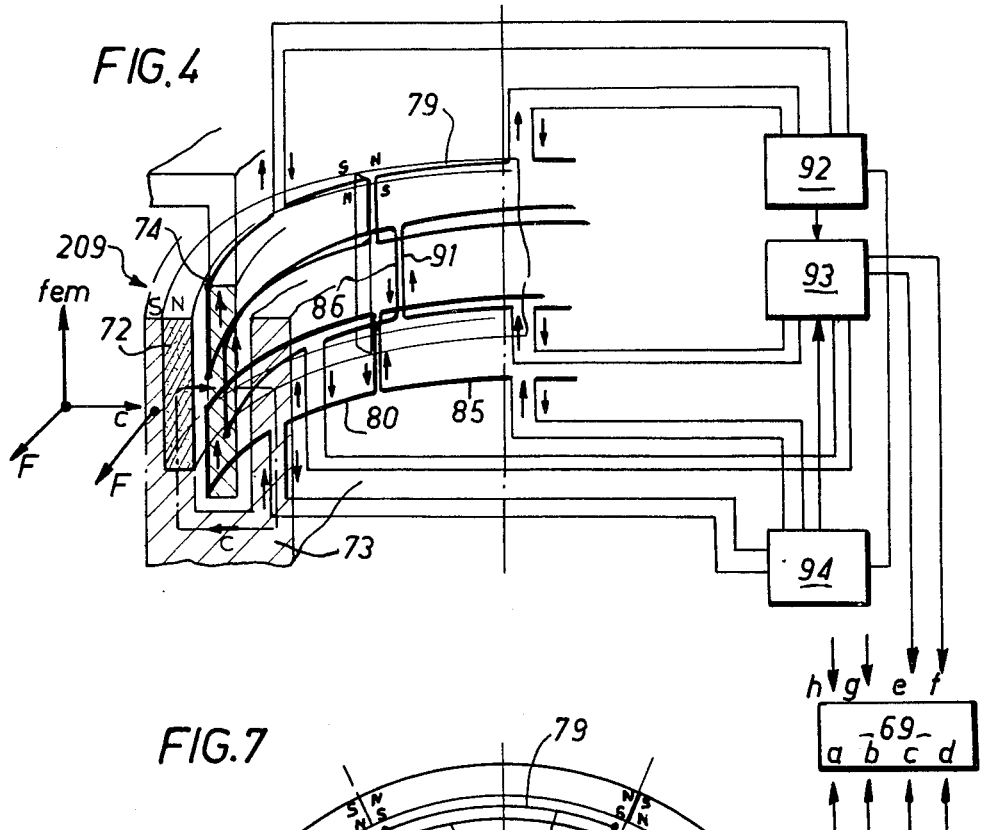
FIG. 4 is a partial perspective showing of the sensor for sensing the axial position of the satellite momentum wheel of FIG. 1.
Figure 7:
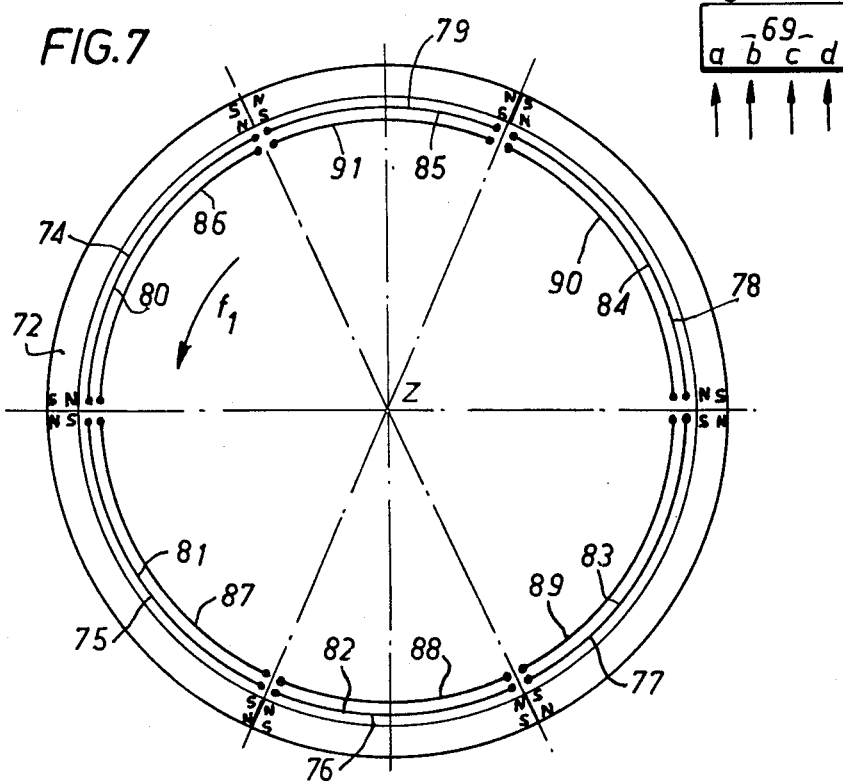
FIG. 7 is a diagrammatic view on the line VII—VII of FIG. 1, showing the arrangement of the windings of the axial position sensor of FIGS. 4 through 6.

The axial position sensor 209 schematically illustrated in FIG. 17, operation of which is exactly as described with reference to FIGS. 4, 5 and 6.

The axial velocity sensor 208 schematically illustrated in FIG. 18, operation of which is exactly as described with reference to FIG. 1.

With regard to the remaining component parts, to wit the motor-generator and the axial actuator, arrangements and adaptations are made necessary by the fact that there is a transition from one pair of components to a single component, as already indicated.

In the case of the motor-generator, it is to be noted first that in the form of embodiment in FIG. 1 recourse is had to two upper and lower centering motor-generators each of which operates according to the diagram in FIG. 14. In this case, magnetic core 25 has a high aspect ratio in order to be able to perform a radial centering function in addition to its function during operation in the motor or generator mode.

In the simplified embodiment illustrated in FIG. 10, use is preferably made of a single motor-generator 202b of the type shown diagrammatically in FIG. 15, which is designed as a variant on the embodiment in FIG. 14, in which variant the magnetic cores 25b fast with the rotor straddle the coils 21b wound on a core fast with the stator.

In the alternative simplified embodiment shown in FIG. 11, recourse is preferably had to a single motor-generator 202c of the type diagrammatically illustrated in FIG. 16, in which there is provided on the stator periphery a circuit of axial turns and, on the rotor, magnets with an alternating radial magnetic field C arranged in sectors opposite said turns, and the direction of the current I in the successive turns is reversed, as shown at A and B, in order to produce a cumulative effect in the electromotive forces F which rotate the armature about its axis or, conversely, a rotation of the field magnet generating currents in the turns in accordance with the laws of induction.

FIG. 19 schematically depicts the operation of the upper and lower axial actuators 206 and 207 respectively, used in the form of embodiment of FIG. 1 to provide axial servo-control.

As explained precedingly, the simplification consisting in achieving axial servo-control by means of a single axial actuator calls for certain modifications. In the case of the form of embodiment in FIG. 10, recourse is preferably had to a one-coil actuator designated by reference numeral 206b. In the case of the form of embodiment in FIG. 11, use may be made with advantage of a two-coil actuator designated by reference numeral 206c.

Each of the axial actuators described hereinbefore with reference to FIGS. 20 and 21 in succession will now be described in detail.

The principle governing operation of the axial actuator 206b illustrated schematically in FIG. 20 is based on the superimposition of a magnetic flux engendered by a coil upon a magnetic flux furnished by a magnetic core. By appropriately devising the various parts of the actuator and by operating on the coil current in one direction or the other, this process can be used to obtain axial forces in the air gaps proportional to the destabilizing errors ascertained by the axial velocity and axial position sensors 208 and 209 respectively.

FIG. 20 shows that a magnetic core 63b concentric with the geometrical spin axis XY of the rotor closes its radial magnetic field through the air gaps 301–302 of two interrupted cylindrical half-yokes arranged axially on either side of said core, and the magnetic field of coil 63b closes through a yoke the poles 303–304 of which engage into said air gaps of said interrupted half-yokes fast with the rotor 1b. It will be manifest therefore that the coil magnetic field $\vec{B}_3$ will be added algebraically to the core magnetic fields $\vec{B}_1$ and $\vec{B}_2$, as a result of which the fields in air gaps 301a, 301b and 302c, 302d will differ greatly from one another depending on the direction and intensity of the current in coil 65d.

In the example illustrated in FIG. 20, it is accordingly possible to represent the fields in the air gaps as follows:

$$301a \rightarrow \vec{B}_1$$

$$301b \rightarrow \vec{B}_1 + B_3$$

$$302c \rightarrow \vec{B}_2 - B_3$$

$$302d \rightarrow \vec{B}_2$$

It should be noted:
firstly, that an absence of current in the coil does not cause the field $\vec{B}_3$ to appear but that the permanent fields $\vec{B}_1$ and $\vec{B}_2$ contribute to the radial stiffness of the device;

and, secondly, that the faces of airgap elements 301 and 302 are serrated annularly in order to increase the axial stiffness of the device 206b.

Following a similar concept, FIG. 21 shows an arrangement in which the magnetic core 63c rigid with rotor 1C produces a radial field $\vec{B}_6$ which closes through two toroidal yokes 401–402 fast with the stator 2C and positioned axially on either side thereof, and the coils 65 c1 and 65 c2 respectively disposed inside said toroidal yokes close their magnetic fields $\vec{B}_4$ and $\vec{B}_5$ in such manner that the magnetic fields $\vec{B}_4$, $\vec{B}_5$, $\vec{B}_6$ are likewise added together algebraically.

In the example shown in FIG. 21, the fields in the air gap $a$ are $\vec{B}_6 - \vec{B}_4$ and those in airgap $b$ are $\vec{B}_6 + \vec{B}_5$. Thus the direction and intensity of the current in the coils monitored by the velocity and axial position sensors can be used to control the field and hence the force in each air gap. Obviously, the annular portions 403 are made of a ferromagnetic material.

It will readily be appreciated that in the two forms of embodiment of FIGS. 20 and 21 referred to precedingly, axial monitoring can be effected in similar fashion to that in the form of embodiment of FIG. 1, the sole difference being that only one axial monitoring device or actuator is employed instead of two and that a coil-generator magnetic field can be superimposed upon the magnetic field issuing from the magnets. However, the locations of the various component parts have been accordingly revised and only one motor-generator has been provided in lieu of the motor-generators described in the first form of embodiment. Furthermore, the passive radial magnetic centering function may alternatively be performed by radially magnetized magnetic cores.

It is to be noted moreover that the anti-friction type and pivot type bearings shown in FIGS. 1, 9, 10 and 11 are back-up bearings for use solely in an emergency, these bearings producing no mechanical contact between the rotor and the stator under normal operating conditions.

I claim:
1. A magnetically suspended momentum wheel for satellites, including a stator within which are disposed:
   a rotor having a rotation shaft with back-up anti-friction bearings capable of selectively bearing against associated safety abutment means;
   a sensor for sensing the axial velocity and a sensor for sensing the axial position of said rotor in relation to said stator;
   at least one passive magnetic radial centering means formed by at least two coaxial magnet cores with alternating axial magnetic fields that are mounted on said rotor and are included, on either side, between two coaxial magnetic cores rigidly connected to said stator and the complementary axial magnetic field of which closes upon said stator through a yoke;
   at least one active magnetic axial centering means formed by at least one magnetic core with a radial field mounted on said rotor and disposed opposite at least one circular coil fast with said stator and receiving correction signals from said axial velocity sensor and said axial position sensor;
   at least one damping means at one end of said rotor and formed by a conducting disc connected to said stator and included between toroidal magnets angularly rigid with said rotor;
   at least one switchable motor-generator formed by at least one alternatingly magnetized magnetic core connected to said rotor and included, on either side, between windings connected to said stator and wound over a ferromagnetic toroidal core;
   whereby those turns of said windings which lie in the air gap engender either electromagnetic forces enabling said magnetic core to rotate through successively switched activation of said toroidal windings subjected one after the other to the same continuous magnetic field, and a unidirectional induced current when said magnetic core is continuously rotated and said toroidal windings are switched in succession after being subjected one after the other to the same continuous magnetic field.

2. A magnetically suspended satellite momentum wheel as claimed in claim 1, in which said axial velocity sensor is formed by: a unidirectional radial magnetic core mounted on said rotor and located opposite a circular coil fast with said stator; a yoke for closing the flux; and monitoring means for picking up the signal generated by the axial motions of said magnetic core relative to said circular coil and for delivering a corresponding correction signal to said magnetic axial centering means.

3. A magnetically suspended satellite momentum wheel as claimed in claim 1, in which said axial position sensor is formed by: a magnetic core having an even number of alternating radial magnetic fields closed by a yoke, said core being mounted on said rotor and located opposite three sets of circular coils with polepitched axial loops fast with said stator, two of said sets forming extensions of each other coaxially with said magnetic core and the third set extending axially between said two sets coaxially therewith and lying constantly in the magnetic field of said core; and monitoring means for picking up the signals resulting from the axial position of said two sets of coils relative to the fields of said core, and this irrespective of the rotation speed provided that the third set of coils furnishes the rotation speed datum regardless of the axial position of said two sets of coils, said signals being applied to said magnetic axial centering means.

4. A magnetically suspended satellite momentum wheel as claimed in claim 1, in which said active magnetic axial centering is performed by a single means the radial magnetic field of whose magnetic core closes through two interrupted cylindrical half-yokes positioned axially on either side of said core and whose coil-induced magnetic field closes through a yoke the respective poles of which engage into the interrupted portions of the half-yokes in such manner that the magnetic fields in the coil-yoke and magnetic-core-yoke air gaps be algebraically variable in either axial direction as a function of the magnitude of the current applied to the coil by said velocity and axial position monitoring means.

5. A magnetically suspended satellite momentum wheel as claimed in claim 4, in which those yoke portions which form said air gaps are annularly serrated in order to increase the axial stiffness of the system.

6. A magnetically suspended satellite momentum wheel as claimed in claim 1, in which said active magnetic axial centering is performed by single means the radial magnetic field of whose magnetic core closes through two toroidal yokes positioned axially on either side of the magnetic core and the magnetic field of each of whose two coils positioned within said toroidal yokes respectively closes through the magnetic core in such manner that the magnetic field in each air gap formed between each toroidal yoke and the magnetic core be algebraically variable in either axial direction as a function of the magnitude of the current applied to the coils by said velocity and axial position monitoring means.

7. A magnetically suspended satellite momentum wheel as claimed in claim 1, in which a single motor-generator is employed and includes, on the rotor, at least one magnetic core alternatingly magnetized relative to stator windings and wound over a ferromagnetic toroidal core, those turns of the windings which lie in the air gap generating either electromagnetic forces enabling the magnetic core to be continuously rotated through successively switched activation of the core windings subjected one after the other to the same magnetic field, and a unidirectional induced current when the core is continuously rotated and the core windings are switched in succession after being subjected one after the other to the same magnetic field.

8. A magnetically suspended satellite momentum wheel as claimed in claim 7, in which said single motor-generator includes, on the rotor, two magnetic cores of alternating polarities that straddle the stator winding, the latter being wound around a toroidal core.

9. A magnetically suspended satelitte momentum wheel as claimed in claim 1, in which a single motor-generator is employed and includes, along the stator periphery, a circuit of axial turns and, on the rotor, magnets with an alternating radial magnetic field arranged sectorially opposite said turns and in which the direction of the current in the successive turns is reversed in order to produce an additive effect in the electromotive forces that rotate the inductor about its axis and, conversely, rotation of the inductor generating currents in the turns.

10. A magnetically suspended satellite momentum wheel as claimed in claim 1, in which said passive magnetic radial centering is performed by magnetic cores with a radial magnetic field closing through concentric rings of ferromagnetic material coaxial with said magnetic cores.

11. A magnetically suspended satellite momentum wheel as claimed in claim 1, in which said switching of the core windings is effected with optical means which include a light source and a photodiode-type detector connected to the stator and at least one reflecting mirror connected to the rotor.

12. A magnetically suspended satellite momentum wheel as claimed in claim 1, in which said rotor comprises interconnecting means between the rim and the hub of the so-called cycloprofile kind wherein the rim is made of an impregnated filament type wound material the layered wires or filaments of which extending from the rim circumvent the hub without interruption.

13. A magnetically suspended satellite momentum wheel as claimed in claim 1, in which the coaxial magnetic cores are made of samarium-cobalt and are encased in a doped elastomer and supported axially by fine steel wires.

14. A magnetically suspended satellite momentum wheel as claimed in claim 1, in which an envelope formed by two impregnated wire-wound half-casings encloses said rotor.

* * * * *